Jan. 15, 1924.
S. J. POPLAWSKI
1,480,914
BEVERAGE MIXER
Filed Feb. 18, 1922
2 Sheets-Sheet 1
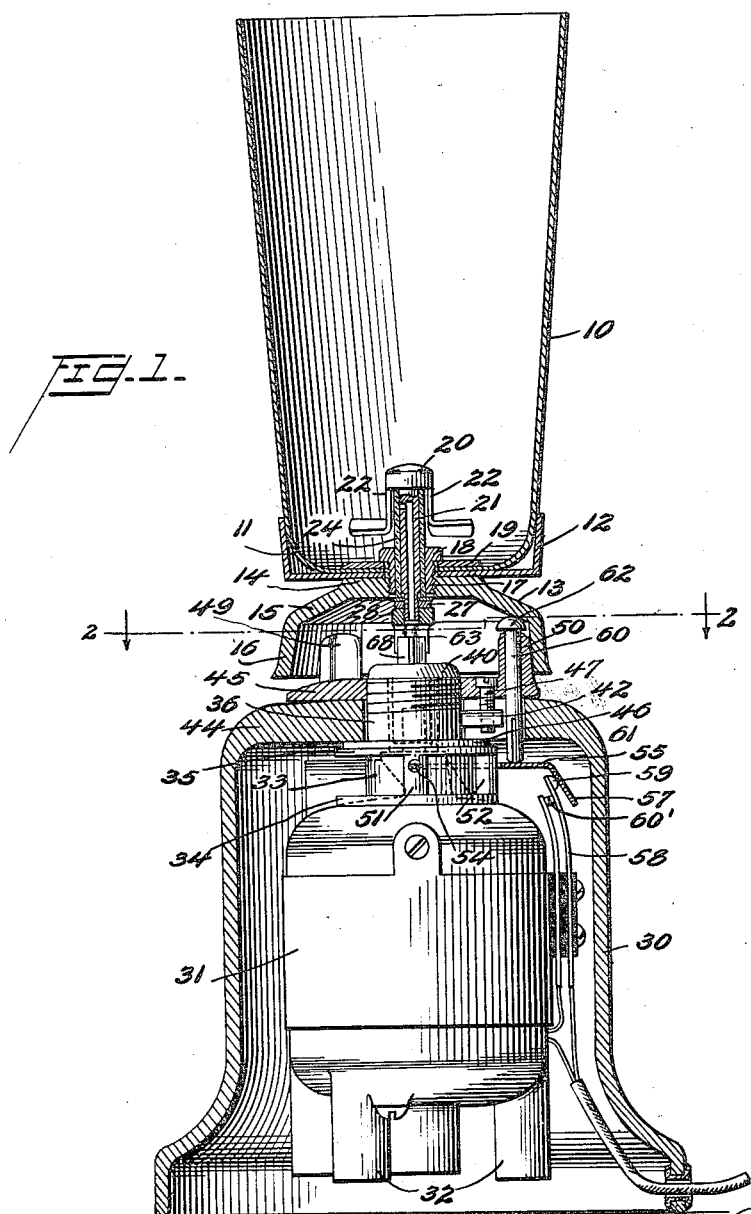

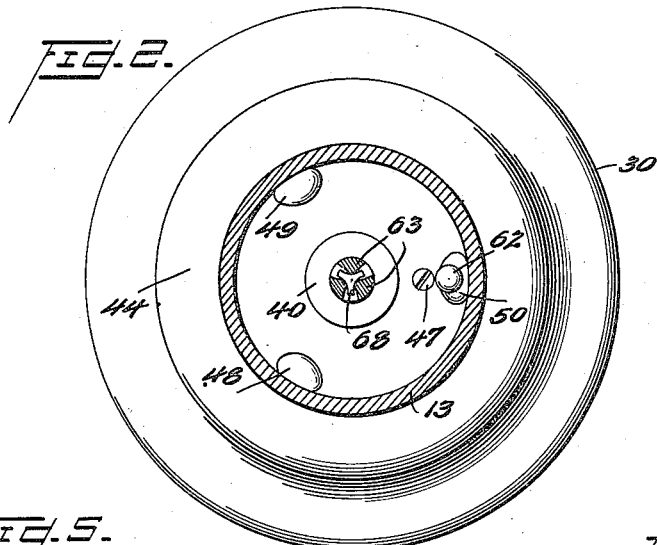
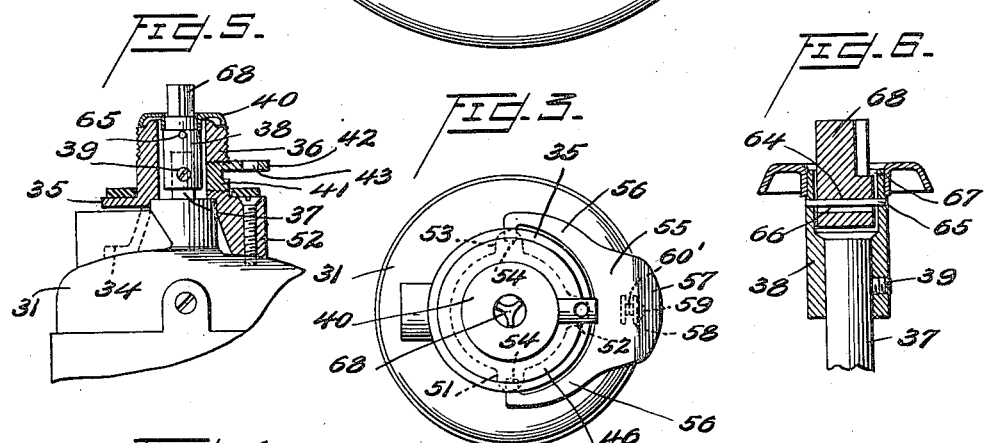
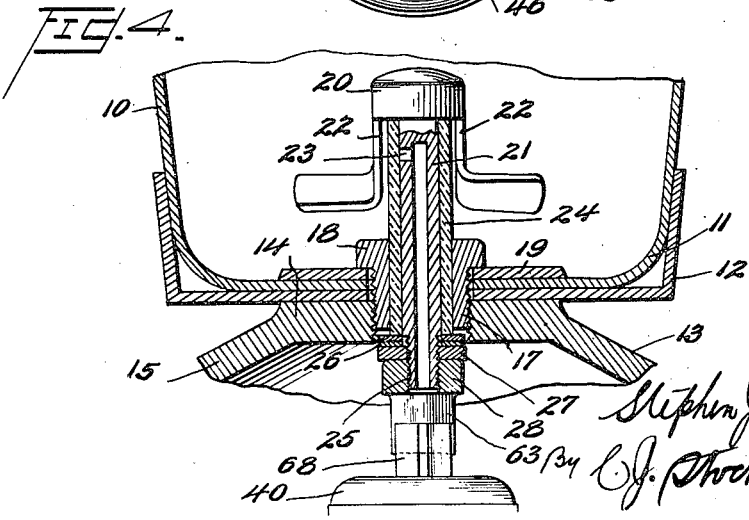

Patented Jan. 15, 1924.

1,480,914

UNITED STATES PATENT OFFICE.

STEPHEN J. POPLAWSKI, OF RACINE, WISCONSIN, ASSIGNOR TO ARNOLD ELECTRIC COMPANY, OF RACINE, WISCONSIN, A CORPORATION OF WISCONSIN.

BEVERAGE MIXER.

Application filed February 18, 1922. Serial No. 537,439.

*To all whom it may concern:*

Be it known that I, STEPHEN J. POPLAWSKI, a citizen of the United States, residing at Racine, in the county of Racine and State of Wisconsin, have invented certain new and useful Improvements in Beverage Mixers, of which the following is a specification.

This invention relates to a beverage mixer and more particularly to such a mixer comprising a stand inclosing an electric motor and a beverage container provided with a rotating agitator therein, means being provided for connecting the rotating agitator to the shaft of the motor and for starting the motor upon the placing of the container upon the stand.

The particular adaptation of the invention which has been chosen for the purpose of illustration is that of a beverage mixer usually found at so-called soda fountains and in which the liquid to be mixed is placed into a container having near its bottom a rotating agitator, which container is adapted to be placed upon the stand inclosing the electric motor, suitable connections being provided between the motor shaft and the agitator. Upon a rotation of the motor the agitator will be rotated, and the motor is controlled by the placing of the container upon the stand.

The object of the invention is the production of a mixer of the type set forth, in which the mere placing of the container upon the stand will cause the actuation of a switch controlling the electric motor. A further object is the adequate protection of the working parts from the injurious effects of liquid which may be spilled in the operation of the machine, in pursuance of which object the motor and control switch are located within the stand.

A further object of the invention is the provision of a switch control for an electric motor which will be set in operation upon the placing of the container upon the stand. Another object is the locating of the switch within the stand and provision of a simple operating means therefor which projects above the stand and in the path of the container. A still further object is the production of a switch actuating mechanism of novel design.

Another object of the invention is the production of an improved construction of container base and centering means therefor upon the mixer stand. Another object is the production of an improved coupling between the agitator in the container and the motor shaft.

Another object of the invention is the provision of an improved rotating agitator within the container, specially designed to prevent the passage of liquid along the agitator shaft to the parts below, in pursuance of which object the agitator is so constructed as to set up a suction of the liquid away from the shaft.

Another object is the selection of material for the several parts which will avoid necessity of lubrication, although provision has been made in the construction of the parts for such lubrication.

Other objects and advantages of the invention will hereinafter appear in the following description and the novel features thereof will be particularly pointed out in the appended claims.

Like reference numerals indicate like parts throughout the several figures of the drawings, in which—

Figure 1 is a general vertical sectional view through the complete beverage mixer showing the motor and some associated parts in elevation, Figure 2 is a horizontal section taken upon the line 2—2 of Figure 1, Figure 3 is a plan showing parts of the switch actuating means, and Figures 4, 5 and 6 are sectional views showing elements of the invention.

It will be understood that my invention may be incorporated in a number of embodiments and that the details of construction may be varied within wide limits without departing from the spirit of the invention as set forth in the claims, and that the embodiment herein shown and described is merely indicative of the invention. This embodiment, however, has been found to be practical in construction and operation.

My invention may be said to consist of four principal features, as follows: The improved construction of beverage container with its base and rotating agitator, the stand inclosing the electric motor and the manner of attaching the same to the stand, the specific construction of electric switch control for the motor, and the co-acting elements whereby the container may be supported upon the stand and at the same time produce an easy connection between the motor shaft and the agitator shaft and an actuation of the switch to start the motor. These parts will be specifically described and their individual functions set forth, after which a recital of their conjoint operation will be given.

The container 10 is made of sheet material spun to produce a curved bottom 11 on which is pressed the metal cap 12. An inverted cup-shaped base 13 is secured to the bottom of the container in a manner hereinafter explained, and comprises a portion 14 lying flat against the bottom of the container, a flaring portion 15 and a cam portion 16, the purpose of which parts will hereinafter appear.

The bottom of the container is provided with an aperture and the base with a registering aperture which is screw threaded. These two parts are securely fastened together by means of the threaded nipple 17 having the head 18. A washer 19 is provided between the head 18 and the container bottom so that when the base is tightly screwed upon the threaded end of the nipple, a liquid tight joint will be formed between the head 18 and the container bottom.

Associated with these parts is an agitator of special formation. As shown it comprises a head 20 having a depending shaft 21, hollow for most of its length, and two depending blades 22, 22, the ends of which are turned outwardly so as to occupy two intersecting planes approaching the horizontal. At its upper end this hollow shaft is provided with an aperture 23. All these parts of the agitator have been shown as being made in one piece. Surrounding the shaft 21 and held firmly within a suitable bearing aperture in the nipple 17 is a bushing 24 of bakelite. At the lower end of the shaft 21 is a reduced screw threaded portion 25 on which is mounted the spring lock washer 26, the retaining nut 27 and one portion 28 of a coupling.

It will be observed that the close fitting of the bakelite bushing 24 within the nipple 17 will maintain in a position to project into the container and that the spring lock washer and the retaining nut will maintain the under surface of the head 20 in close fitting relation with the upper end of the bushing, producing a normally liquid tight joint between these parts. It will also be appreciated that the screw threads upon the end 25 of the shaft and in the apertures of the several parts mounted thereon must be selected with special reference to the direction of rotation of the shaft when being driven. In the present case they are left screw threaded so as to avoid any danger of the parts becoming loose in the rotation of the shaft.

In agitating devices of this general type, difficulty has been experienced in preventing the liquid being mixed from entering the bushing or bearing under the high pressure which is developed in the immediate neighborhood of the end of the bearing by the rapidly revolving agitator. This has been overcome by the particular construction of agitator shown, wherein the blades have been dropped considerably below the bearing end and their shape tends to draw the liquid away from the bearing in the operation of the device. To increase the insurance against leakage of the liquid being mixed into the bearing, the spring tension provided by the spring washer 26 and operating to hold the bushing end close to the under face of the head 20 has been provided.

The bore in the shaft 21 and the aperture 23 has been provided for the purpose of permitting lubrication of the shaft within the bushing by turning the container up side down when a few drops of lubricant may be placed in the bore of the shaft which will find their way through the aperture 23 to the bearing surface. However, it has been found that a steel shaft working in a bakelite bearing has required little or no lubrication, good results being secured even though lubrication is entirely overlooked.

Referring again to Figure 1, the mixer stand is designated by the numeral 30 and consists of an iron body coated with a suitable material, such as porcelain. Within this stand the motor of my mixer is secured. The motor itself is designated by the numeral 31 and is provided at its lower end with a plurality of feet 32 and at its upper end with a collar 33 fitting over the end of the motor casing and enclosing the end of the motor shaft. The collar comprises a body provided with a lower flange 34 and an upper flange 35, from which rises a neck 36 having its upper portion screw threaded. It will be understood that this collar is attached to the motor casing by suitable machine screws.

The usual projecting end of the motor shaft is indicated by the numeral 37, upon which is secured a sleeve 38 by set screw 39. Upon the upper end of the sleeve is pressed a stamped bearing plate 40 which revolves with the motor shaft upon the upper end of the neck 36. A screw threaded aperture of relatively large size is provided in the neck 36 at a point where the set screw 39 might be brought into register with it, and through which the set screw may be manipulated. This aperture accommodates a screw plug 41 of peculiar formation, having a portion 42 projecting outwardly and provided with an aperture 43 for the purpose to be presently set forth.

In the upper flat portion 44 of the stand 30 is cut a keyhole slot, through the circular portion of which projects the neck 36 of the collar 33, and upon said neck is adapted to be screwed a clamping plate 45, one of the functions of which is to hold the motor securely within the stand 30. Washers of rubber or other suitable material designated by the numeral 46 encircle the neck 36 and lie between the flange 35 and the under face of the flat portion of the stand to prevent any leakage of liquid through the connection just described. After the clamping plate has been secured firmly in place, a retaining screw 47 is passed through a suitable screw threaded aperture in the clamping plate so that its end will be inserted in the aperture in the projecting portion of the screw plug 41, it being understood that this screw plug at this time lies in the straight portion of the keyhole slot in the flat portion of the stand.

Projecting from the upper face of the stand is positioning means for the reception of the receptacle 10, said means being shown as three centering lugs 48, 49 and 50, the purpose of which is to receive and center the cam portion 16 of the container base 13 when the container is placed upon the stand 30 to the end that coupling of the ends of the motor and agitator shafts may be accomplished and the switch for the electric motor actuated, besides forming a secure connection between the container and stand. It will be appreciated that the taper of the cam portion 16 fitting over the three projecting lugs accomplishes a secure wedging mounting for the container upon the stand and effectually avoids any tendency for the container to topple over, as sometimes happens with constructions at present in use.

Upon the side of the motor is mounted a switch comprising two spring plates, securing screws, insulating spacers and bushings similar in most respects to those shown in my pending applications for patents upon mixers. It will be understood that when the upper ends of these spring switch elements are brought together current from a suitable source will flow through the motor and through the switch. The present invention has to do more particularly with the special means employed for the purpose of actuating the switch by bringing these ends together.

Extending between the flanges 34 and 35 of the collar 33 are ribs 51, 52 and 53 and through these ribs vertically extend the bolts by means of which the collar is attached to the casing of the motor. In the walls of the ribs 51 and 53 lying diametrically opposite each other are provided bearing apertures for the pivot ends 54, 54, of a switch actuator. This actuator is shown as stamped from sheet metal and having the general form of a yoke, the legs 56, 56, of which encircle the collar 33 and are provided with pivot ends 54, 54. The forward portion of this actuator is bent downwardly to form a lip 57. Upon the spring switch member 58 is a button 59 of insulating material upon which the lip 57 rides in the pivotal movement of the actuator 55.

It will be noted that in the position of the parts shown in Figure 1 the upper ends of the spring switch members are pressed from a vertical position toward the motor casing with the platinum points in contact, when current will be passed through the motor. The resiliency of the spring members tend to return them to a vertical position and to lift the actuator 55 by pressure upon the lip 57.

In the centering lug 50 a vertical bore is provided, into which is mounted the bolt 60 whose lower end is slitted as at 61 to maintain it in the bore of the centering lug against accidental removal. The bolt is provided with a semi-spherical head 62. As shown in Figure 1, the under face of its head is in contact with the upper end of the centering lug, due to the weight of the container as it was placed upon the centering lugs, the flared portion 15 of the base 13 bearing upon the head 62. In this position of the parts it will be seen that the lower end of the bolt rests upon the upper face of the actuator 55. In its sliding movement the bolt works in the slotted portion of the keyhole slot in the upper portion of the stand. As shown in Figure 2 the bolt and the retaining screw 47 lie in the same radial line.

In order to accomplish an easy coupling of the agitator shaft with the motor shaft in the placing of the container upon the centering lugs, I have provided specially formed coupling elements and have mounted one of said elements in a special manner to secure a universal movement thereof, so that any slight lack of alignment in the presentation of the parts will not prevent automatic coupling.

Upon the lower end of the agitator shaft 21 is the coupling element 28 screw threaded into firm and rigid position upon said shaft. This member has three depending engaging lugs 63 each having a generally triangular cross section with two sides slightly curved inwardly, as best seen in Figure 2. Within the sleeve 38 is mounted the lower end of a companion coupling member 64 in a substantially universal manner permitting a limited pivotal movement in all directions. A pivot pin 65 extends across the sleeve through a pivot aperture 66 in the coupling member. The pivot aperture is bored with each of its ends larger than the center of the bore, permitting a rocking movement of the coupling member upon the pin as well as a true pivotal movement, and combinations of these two movements accomplish universal movement of this coupling element. It will be understood that the upper edge of the sleeve 67 defines the limits of these movements. Rising from the pivot section of this coupling element is an engaging stud 68 of substantially triangular form in cross section, as shown in Figures 2 and 3, but with the sides of the triangle curved inwardly slightly. The upper ends of these curved sides may be bevelled.

It will be seen that by reason of the several features, namely, the universal pivotal mounting of the coupling member, the curved triangular sides of the engaging stud and the bevel end of these sides, easy and automatic coupling of the rigid lugs 63 with the stud 68 is accomplished whatever the presentation of the parts when the container is placed upon the stand.

From the foregoing description the operation of the several parts should be readily understood, and it is only necessary to a complete disclosure of the invention to recite their conjoint use. The parts of the container and the agitator having been assembled and the motor and its associated parts having been secured within the stand, the container with the liquid therein is placed upon the stand so that the cam portion 16 of the container base will rest upon the upper ends of the three centering lugs. The bolt 60 in this position of the parts will be raised under the influence of the spring switch elements. Upon depressing the container base upon the centering lugs, the container will be firmly supported in a true upright position upon the stand 30, and in this movement the bolt 60 will be depressed by the portion 15 of the container base.

The lower end of the bolt will rest upon the upper face of the actuator 55 and depress the same so that the lip 57 riding upon the insulating button 59 will place the points 60' into contact. This establishes electric connection for the motor which will be set in operation.

While the container base is being pressed down upon the centering lugs, the engaging lugs 63 of the coupling element 28 are brought into position to engage with the stud 68 of the companion coupling element, the special formation of the stud and its mounting enabling the parts to be readily coupled.

A simple lifting of the container from the stand will cause the coupling elements to be disengaged and the bolt 60 to be raised under the influence of the actuator 55 and spring switch element 58, stopping the motor by the automatic opening of the motor switch.

Having described my invention, what I claim as new and desire to secure by Letters Patent is:

1. In a mixer, the combination with a stand, an electric motor inclosed by said stand and comprising a rotor having a shaft projecting from said stand, and a controlling switch within said stand, of a container adapted to be placed upon said stand and having therein an agitator comprising a shaft projecting from the bottom of said container, clutch connections between the rotor and agitator shafts, and means for actuating said switch upon the placing of the container upon the stand.

2. In a mixer, the combination with a stand, an electric motor and a control switch therefor within the stand, of a container carrying an agitator whose shaft extends through the bottom thereof, and cooperating parts upon said stand and container comprising means for coupling said agitator and motor shafts, means for centering the container upon the stand, and means for actuating the control switch within the stand upon the placing of the container upon the stand.

3. In a mixer, the combination with a stand inclosing and supporting an electric motor and a control switch therefor, of a container inclosing and supporting a rotary agitator whose shaft extends through the container bottom, centering means projecting from said stand and a base on said container adapted to be centered thereby, coupling members upon the shafts of said agitator and said motor adapted to be engaged when the container is centered upon the stand, and means for actuating said switch within the stand in the act of placing the container upon the stand.

4. In a mixer, the combination of a stand, an electric motor carrying a control switch inclosed in said stand, said motor being provided with a neck adapted to lie in an aperture in the top of said stand, a clamping plate for securing the said neck to the stand, lugs or projections upon said plate, a container having a base of inverted cup formation adapted to engage said lugs or projections in the placing of the container upon the stand, coupling members upon the shafts of said motor and agitator, and actuating means for said control switch comprising a depressible pin projecting from the stand and lying in the path of said base.

5. In a mixer, a stand having an aperture therein, an electric motor inclosed in said stand and provided with a neck projecting through said aperture, a securing plate cooperating with said neck to secure said motor to said stand, a control switch attached to said motor, and means for actuating said switch comprising a sliding pin passing through said plate and stand.

6. In a mixer, a stand having a keyhole slot in its upper face, an electric motor enclosed in said stand and provided with a screw threaded neck projecting through said slot, a projection from said neck lying within the narrow portion of said keyhole slot, a securing plate having a screw threaded aperture therein and cooperating with said neck to secure said motor to said stand, and a retaining bolt passing through said plate and through said neck projection to hold the parts from relative movement.

7. In a mixer, a stand having an aperture therein, an electric motor enclosed in said stand, a collar mounted upon the motor casing and provided with a neck projecting through said stand aperture, a securing plate cooperating with said neck to secure said motor to said stand, a switch mounted on said motor within the stand, and a switch actuator mounted upon said collar, and means extending from said stand for depressing said actuator to control said switch.

8. In an electric motor, a casing, a switch carried by said casing, a collar mounted at one end of said motor casing, an actuator for said switch pivoted to said collar, and means for depressing said actuator to close said switch.

9. In a mixer, the combination with a container having a base of inverted cup-shape comprising a cam portion, and a stand having centering means projecting from its upper face and into the cam portion of said cup-shaped container base to form a wedge mount for said container upon said stand.

10. In a mixer, the combination with a container having a base of inverted cup-shape and a stand having a centering projection extending into said container base, one of said last named members being provided with a cam portion to form a wedge mount for said container upon said stand.

11. In a mixer, the combination with a stand provided with means for supporting a motor and a switch therein, said means comprising a securing plate having a plurality of centering lugs projecting upwardly therefrom, one of said lugs being provided with an aperture therein, means for actuating said switch comprising a sliding pin mounted in said lug aperture, and an actuator pivoted to said motor and adapted to be depressed by said pin to bring the switch elements into contacting relation.

12. In a mixer comprising a stand and a motor supported thereby, a container and a rotating agitator therein, the shafts of said motor and said agitator being mounted in substantial alignment, and coupling elements upon the ends of said shafts and adapted to be brought into engagement by the placing of the container upon the stand, one of said coupling elements being mounted upon its shaft for limited universal pivotal movement.

13. In a mixer comprising a stand and a motor support therefor, a container and a rotating agitator therein, the shafts of said motor and said agitator being mounted in substantial axial alignment, coupling elements upon the ends of said shafts adapted to be brought into engagement by the placing of the container upon the stand, one of said elements comprising three substantially triangular lugs and the other comprising a substantially triangular stud, whose apices are adapted to lie between the said triangular lugs.

14. In a mixer comprising a stand and a motor supported therein, a container and a rotating agitator therein, the shafts of said motor and said agitator being mounted in substantial axial alignment, coupling elements upon the ends of said shafts and adapted to be brought into engagement by the placing of the container upon the stand, one of said elements comprising three substantially triangular lugs and the other comprising a substantially triangular stud, whose apices are adapted to lie between the said triangular lugs, one of said elements being rigidly mounted upon its shaft while the other is mounted in a manner to secure limited universal pivotal movement, and one of said elements having its engaging surfaces bevelled to facilitate engagement between the elements.

15. In a container for mixing apparatus, the combination of a vessel, a base therefor, an apertured nipple for connecting said base to said vessel, a bearing mounted in the aperture of said nipple, an agitator comprising a shaft rotating in said bearing, a head and blades, and means for maintaining the under surface of said head in contact with the upper end of said bearing.

16. In a container for mixing apparatus, a vessel, a base therefor, an apertured nipple connecting said vessel and base, a bushing fixed in said aperture, an agitator comprising a shaft with a screw threaded lower end adapted to rotate in said bushing, a head upon said shaft having arms depending therefrom and blades on said arms, a lock washer and nut upon said shaft end for holding said shaft within said bushing and the head of said agitator in contact with the upper end of said bushing, and a coupling element upon the end of said shaft.

In testimony whereof I affix my signature.

STEPHEN J. POPLAWSKI.